May 22, 1923.
W. M. WHITE
OILING DEVICE
Filed July 21, 1921
1,455,947
2 Sheets-Sheet 1
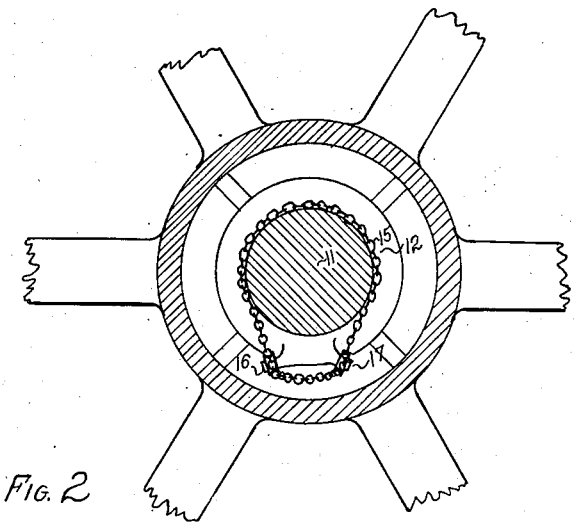
FIG. 2
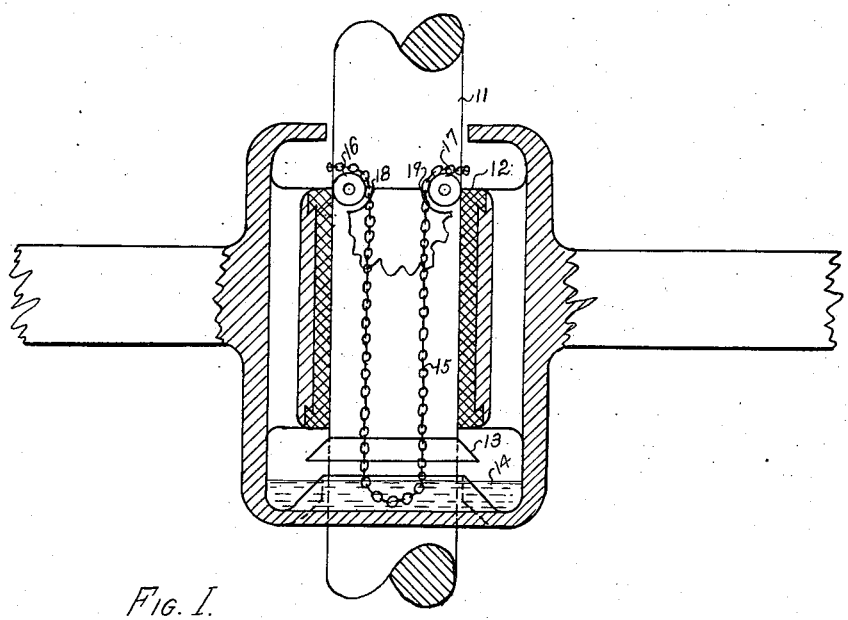
FIG. I.
INVENTOR
William Monroe White May 22, 1923.

W. M. WHITE

OILING DEVICE

Filed July 21, 1921

INVENTOR
William Monroe White.

Patented May 22, 1923.

1,455,947

UNITED STATES PATENT OFFICE.

WILLIAM MONROE WHITE, OF MILWAUKEE, WISCONSIN.

OILING DEVICE.

Application filed July 21, 1921. Serial No. 486,413.

*To all whom it may concern:*

Be it known that I, WILLIAM MONROE WHITE, a citizen of the United States, residing at Milwaukee, in the county of Milwaukee and State of Wisconsin, have invented certain new and useful Improvements in Oiling Devices, of which the following is a specification.

The invention relates to oiling devices for bearings supporting vertical rotatable shafts.

The invention relates more particularly to the oiling of the guide bearings on vertical shafts and such bearings as are equipped with oil catchers below the bearing.

The invention designs to provide a simple and efficient means of conveying the oil from the oil collecting basin below the bearing to the top of the bearing where it is directed by gravity thru the bearing. The present arrangement of oiling for guide bearings on vertical shafts consists generally in an oil supply bearing, tank, reservoir or pressure main usually controllable by a valve. After the oil passes thru the guide bearing it is led to a collecting sump and pumped by mechanical means back to the supply tank, reservoir, or pressure main. The invention designs to eliminate the expensive tanks, piping, and pumps.

The invention will be more readily understood by reference to the drawings, wherein;

Fig. 1 is a cross-sectional elevation thru a guide bearing showing a simple form of the device.

Fig. 2 shows a plan view of the device.

Figure 3:
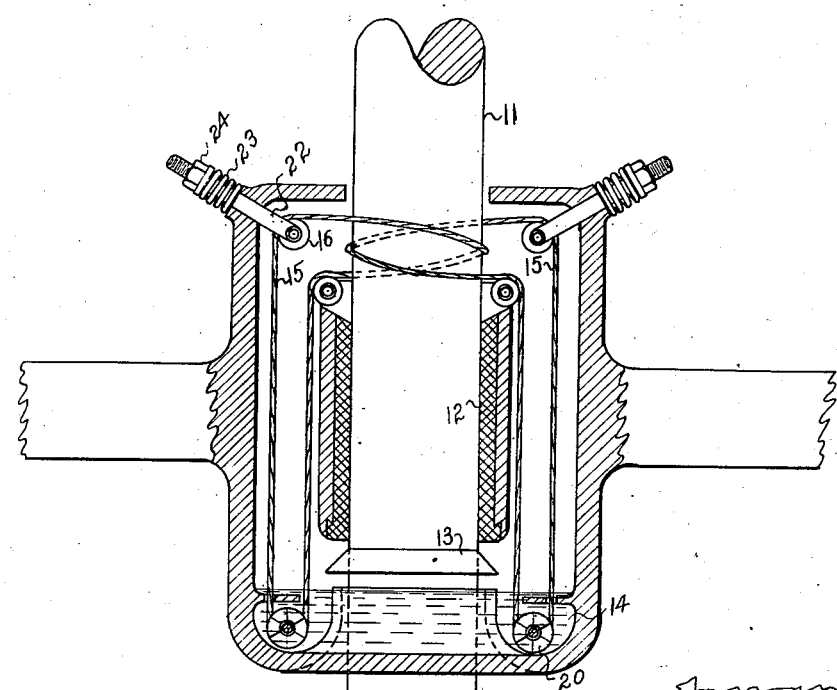
Fig. 3 is a vertical section thru a guide bearing showing a preferred form of the device.

In Fig. 1 it will be noted that a shaft 11 is supported by a babbitted guide bearing. An oil shedder 13 deflects the oil from the shaft into an oil reservoir 14. An endless flexible member 15 loops around the shaft above the babbitted guide bearing and loops into the oil in the oil receiver 14 disposed below the guide bearing. The chain is supported and held in position by pulleys 16, 17. The chain need not necessarily revolve at the linear speed of the shaft but by reason of the weight of the vertical portion of the chain that part of the chain looped around the shaft is caused to bear with sufficient force to cause the chain to rotate. A vertical loop of the chain in dipping below the oil in the oil reservoir 14 collects the oil and the oil adheres to the chain and is drawn up over the pulley 16 around the shaft, and a portion of the oil adheres to the shaft passing down and lubricating the babbitted bearing 12. Catch basins 18, 19 are disposed underneath the pulleys to catch the oil taken from the chain by the pulleys. These catch basins are designed to guide the oil into the guide bearing 12.

Fig. 3 illustrates my preferred form of oiling device wherein the bottom of the vertical loop of the flexible member is passed around a pulley 20 disposed in the oil space of the oil chamber 14. The pulley 20 provides for fixing definitely the position of the flexible member with relation to the oil reservoir 14.

Figure 4:
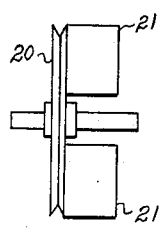
Fig. 4 is an elevation of one of the guide pulleys 20 provided with flexible member speed retarding means.

The pulley 20 has a sharp V groove as shown in Fig. 4. The flexible member 15 binds between the sharp angles of the groove pulley and causes the grooved pulley to rotate substantially at the linear speed of the flexible member. Wing vanes 21, 21 are positioned on the grooved pulley to retard the motion of the pulley in the oil by means of the friction of the wing vanes in the oil. One of the pulleys 16 supporting the flexible member is mounted upon a movable carriage 22 and a spring 23 whose tension may be adjusted by means of an adjustable nut 24, provides for adjusting the tension in the flexible member 15. By adjustment of the adjusting screw 24 the tension in the flexible member 15 passing around the vertical shaft 11 may be adjusted so that the rotating speed of the flexible member may be made any desired amount at will, that is, providing for the drawing up of any desired amount of oil from the reservoir 14 to the top of the guide bearing 12 so as to best suit the speed or conditions under which the shaft is being operated and the amount of oil being required for the lubrication of the bearing. My preferred arrangement is to have the flexible member in duplicate so that in case of the breakage of one member the other will maintain lubrication.

Figure 5:
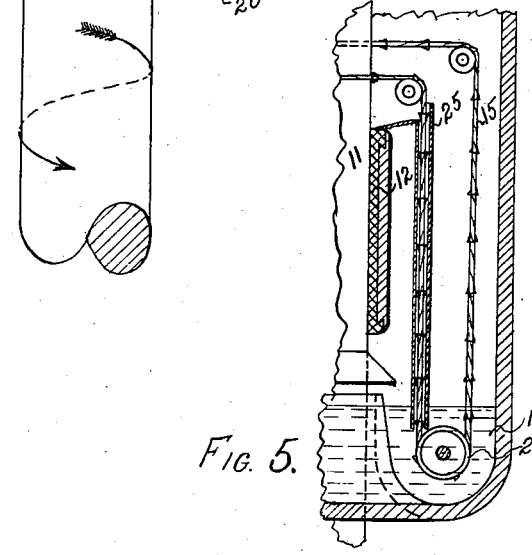
Fig. 5 is a fragmentary central vertical section thru the improved lubricator illustrating another form of flexible member speed retarding means.

It will be obvious that instead of varying the pressure between the flexible member 15 and the shaft 11 with the aid of adjusting devices such as illustrated in Fig. 3, such adjustment may be effected within the flexible member itself. In the case where a coiled spring is utilized as a flexible member, for instance, the degree of tension in the spring may be readily varied by enlarging or diminishing the number of coils, that is automatically varying the engaging pressure of the flexible member against the shaft 11 and simultaneously varying the rate of travel of the member.

Where it is desired to secure an abundant supply of lubrication for the bearing, a device such as illustrated in Fig. 5 may be utilized. In this device a tubular conducting member 25 surrounds one of the vertical stretches of the flexible member 15 which may be provided with lateral projections or other means for positively conducting lubricant from the well 14 thru the conductor 25 and to the vertical shaft bearing. Besides serving to augment the flow of lubricant to the bearing, the conductor 25 and the flexible member 15 co-operating therewith, serve to retard the speed of the member 15.

It should be understood that it is not desired to limit the scope of this invention to the exact details of construction and of operation herein shown and described, as obvious modifications within the scope of the claims may occur to persons skilled in the art.

I claim:

1. In combination, an upright shaft, a bearing for said shaft, a basin below the top of said bearing, and a flexible band movable by said shaft, said band comprising an elevating portion extending upwardly from said basin and longitudinally of said shaft, and a second portion extending laterally from said elevating portion toward said shaft above the bottom of said bearing.

2. In combination, an upright shaft, a bearing for said shaft, a basin below the top of said bearing, and a continuous flexible band movable by direct contact with said shaft, said band comprising an elevating portion extending upwardly from said basin and longitudinally of said shaft, and a second portion extending laterally from said elevating portion to said shaft above the bottom of said bearing.

3. In combination, a vertical rotatable shaft, a bearing for said shaft, a basin below the top of said bearing, and a flexible band movable by said shaft, said band comprising a vertical elevating portion extending upwardly from said basin, and a horizontal portion connecting said vertical portion directly with said shaft above the bottom of said bearing.

4. In combination, a vertical shaft, a bearing for said shaft, a basin below said bearing, and a continuous flexible band movable directly by said shaft, said band comprising a vertical elevating portion extending from said basin above said bearing, and a horizontal portion directly connecting said vertical portion with said shaft above the bottom of said bearing.

5. In combination, an upright shaft, a bearing for said shaft, a basin below the top of said bearing, a flexible band movable by said shaft to convey lubricant from said basin to said bearing, means cooperating with said basin to enclose said band, and adjustable means operable from the exterior of said enclosing means for varying the tension of said flexible band.

6. In combination, means for supporting a vertical rotatable shaft, a flexible member engaging said shaft, means for urging said member against said shaft with sufficient pressure whereby rotation of said shaft will cause said member to move, means for varying the degree of said pressure, and a reservoir for lubricant, a portion of said flexible member extending in proximity to said reservoir whereby lubrication is delivered to said shaft at said point of engagement.

7. In combination, means for supporting a vertical rotatable shaft, a flexible member movable by said shaft to conduct lubricant to said supporting means, and means for retarding the speed of movement of said flexible member.

WM. MONROE WHITE.